United States Patent [19]
Carlson

[11] 3,950,076
[45] Apr. 13, 1976

[54] SNAPABLE AND REMOVEABLE SAFETY REFLECTOR

[76] Inventor: Curt S. Carlson, 1295 Warwick Court, Deerfield, Ill. 60015

[22] Filed: Sept. 11, 1974

[21] Appl. No.: 504,916

[52] U.S. Cl. ................ 350/97; 301/37 SA; 350/99; 350/98
[51] Int. Cl.$^2$ ............................................ G02B 5/12
[58] Field of Search ............ 250/97, 98, 107; 2/265, 2/224, 224 A, 224 R; 301/357, 37 SA; 350/99, 97, 98

[56] References Cited

UNITED STATES PATENTS

| | | | |
|---|---|---|---|
| 2,344,542 | 3/1941 | Fike | 350/99 |
| 2,396,080 | 11/1943 | Bruegger | 350/98 |
| 2,397,801 | 10/1942 | Mitchel et al. | 2/265 |
| 3,659,478 | 5/1972 | Pawsat et al. | 350/97 |
| 3,768,433 | 10/1973 | Dian et al. | 350/99 |
| 3,768,434 | 10/1973 | Pinter | 350/99 |
| 3,809,434 | 5/1974 | Linder | 350/99 |

FOREIGN PATENTS OR APPLICATIONS

| | | | |
|---|---|---|---|
| 369,666 | 12/1939 | Italy | 350/97 |
| 795,644 | 12/1956 | United Kingdom | 350/99 |

*Primary Examiner*—Alfred E. Smith
*Assistant Examiner*—B. Wm. de los Reyes
*Attorney, Agent, or Firm*—Dominik, Knechtel, Godula & Demeur

[57] ABSTRACT

A safety reflector comprising two support members which have snap-acting interlocking means on them for releasably locking or securing them together in spaced apart relationship. At least one side of each of the two support members is provided with a reflective material which will reflect light impinged on it.

9 Claims, 12 Drawing Figures

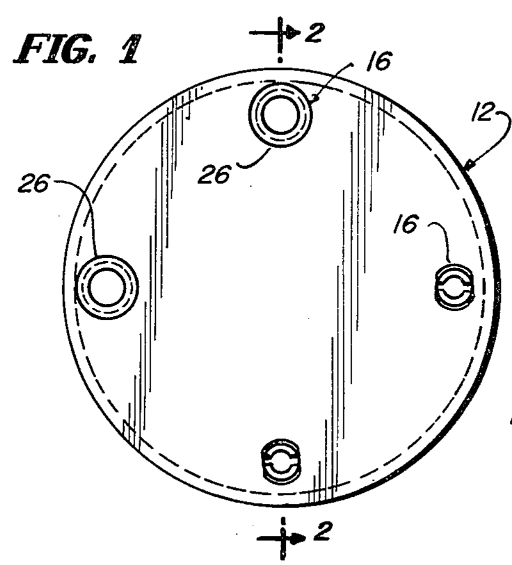
FIG. 1
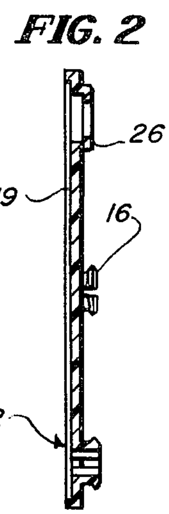
FIG. 2
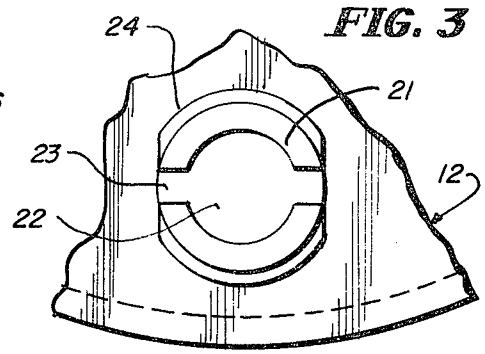
FIG. 3
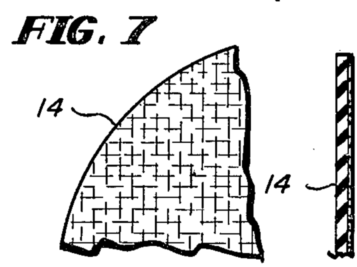
FIG. 7
FIG. 8
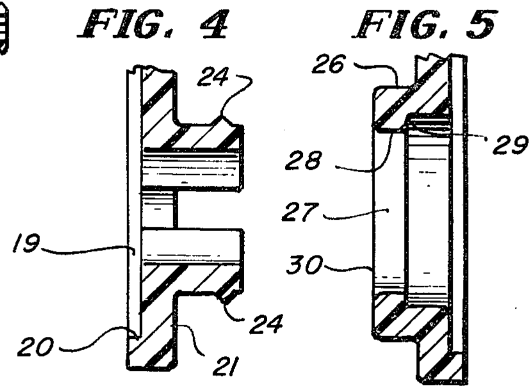
FIG. 4
FIG. 5
18
12
FIG. 10
16
19
19
FIG. 6
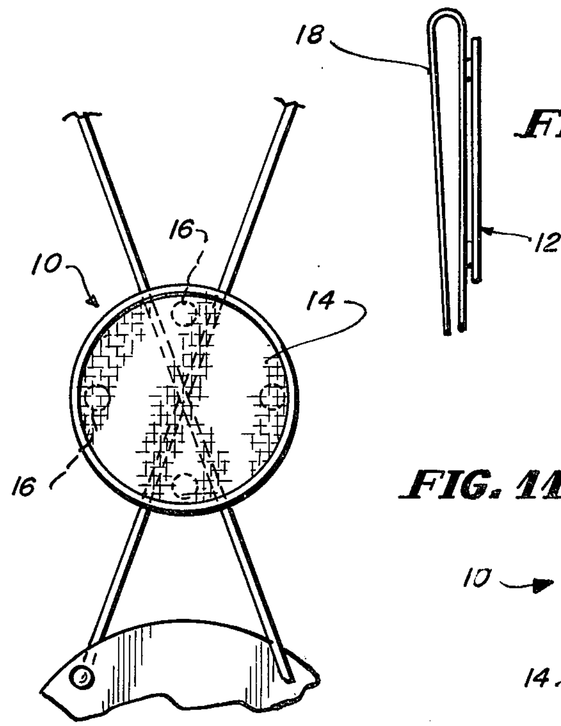
FIG. 9
16
10
14
33
10
14
FIG. 11
FIG. 12

SNAPABLE AND REMOVEABLE SAFETY REFLECTOR

This invention relates to improved safety reflectors and, in particular, to an improved safety reflector which is designed for versatility so that it may be utilized in a number of different applications.

Reflectors which reflect light impinged upon them are well-known and used for many purposes, primarily to alert someone to a potential danger or hazard or to another object. Most of the presently available reflectors are designed or constructed for a particular application, and hence the use of these reflectors are rather limited.

The safety reflector of the present invention, on the other hand, may be worn by a person on, for example, a belt or the like, and may also be affixed to a vehicle such as a bicycle, to either its front and/or rear fender, or to its spoke. Accordingly, the safety reflector is extremely versatile.

More particularly, the safety reflector of the present invention includes two discs which have snap-acting interlocking means on them for releasably locking or securing them together in spaced apart relationship. Two circular shaped discs are illustrated, however, it will be apparent that they likewise can be of many other shapes and configurations. At least one side of each of these two discs is provided with a reflective material which will reflect light impinged on it. In use, a single one of these discs can be secured by means of a nut and bolt assembly to, for example, the fender of a bicycle. Alternatively, or in addition, by using a generally U-shaped band or clamp which is adapted to be secured to the discs, or with the two discs, the safety reflector, or a number of them, can be clipped or secured to a person's belt. Further still, the two discs can be secured to the spokes of a bicycle by securing the two discs together with the spokes effectively clamped between them. Still other uses will be apparent from the description below.

Accordingly, it is an object of the present invention to provide a new and improved safety reflector which is versatile in application.

Other objects of the invention will in part be obvious and will in part appear hereinafter.

For a fuller understanding of the nature and objects of the invention, reference should be had to the following detailed description taken in connection with the accompanying drawings, in which:

FIG. 1 is a back plan view of one of the discs;

FIG. 2 is a sectional view taken along lines 2—2 of FIG. 1;

FIG. 3 is an enlarged rear view illustrating the apertured stud portion of the interlocking means;

FIG. 4 is an enlarged sectional view of the stud portion of the interlocking means;

FIG. 5 is an enlarged sectional view illustrating the spacer portion of the interlocking means;

FIG. 6 is a view illustrating the manner in which the interlocking means are lockingly engaged;

FIGS. 7 and 8 are partial front plan and side views, respectively, of the reflective material used on the discs of the safety reflector;

FIG. 9 illustrates the manner in which the safety reflector is affixed to the spokes of a bicycle;

FIG. 10 is a side plan view illustrating the manner in which one of the discs can be affixed to a U-shaped band to form a belt or pocket reflector;

FIG. 11 is a perspective view illustrating two of the discs affixed to a U-shaped band to form a belt or pocket reflector; and FIG. 12 is a view illustrating the manner in which one of the discs can be affixed to a fender of a bicycle.

Similar reference characters refer to similar parts throughout the several views of the drawings.

Referring now to the drawings, the safety reflector 10 of the present invention is designed primarily to be affixed to the spokes of a bicycle, as illustrated in FIG. 9, to provide side reflectors on the bicycle, as now required by Federal legislation. For this application, the safety reflector 10 is comprised or formed of a pair of discs 12 (FIGS. 1 and 2), each of which is of identical construction and has a reflective material 14 on its front face and interlocking means 16 on its rear face which permit the two discs 12 to be secured together, with the spokes lockingly clamped between the two discs. While the safety reflector 10 is designed primarily for and may probably find its greatest utility in such an application, its design also is such that the two discs 12 can be utilized in combination with a generally U-shaped band 18, as illustrated in FIG. 11, to provide a safety reflector which can be clipped to a belt or to a pocket of a skirt or pants worn by a person. One such disc 12 also can be affixed to such a U-shaped band 18 for the same purpose, or it can be affixed to a fender of a bicycle, as illustrated in FIG. 12. Accordingly, it can be seen that a pair of such discs 12, particularly in combination with a U-shaped band, can be utilized for various different applications.

More particularly, FIGS. 1 and 2 are a back and sectional view, respectively, of the disc 12 of the safety reflector 10. The disc 12 is illustrated as being circular-shaped, however, it will be apparent from the description below that it can as well be other shapes, such as rectangular, triangular and the like, or may even be in the shape of a particular object such as an automobile, a building or a person. The disc 12 preferably and advantageously is molded of a plastic material such as propylene, so that the discs 12 can be inexpensively manufactured.

On the front face of the discs 12, a shallow pocket 19 for receiving therein the reflective material 14 can be provided by forming thereon an annular or peripheral upstanding rim 20 (FIG. 4). The reflective material 14 may be, for example, any one of a number of different commercially available reflective paints or materials, which will reflect light impinged upon it. A preferred material is the reflective material sold under the trademark "HOT DOTS", by the Rowland Development Corporation, Kensington, Conn., since it is found to meet or surpass the requirements established by the Federal legislation pertaining to bicycle reflectors. Further still, this type of reflective material is preferred since indicia such as safety slogans, advertising indicia and other printed matter can be easily applied to it, without materially reducing its effectiveness and without substantially increasing the cost of the safety reflector 10. Such safety reflectors therefore can be used by retailers and others in their advertising, and can be given or sold in the course of business to induce the use of the safety reflectors, to advertise their business and to promote safety.

At least one pair and preferably two pairs of cooperating or complimentary interlocking means 16 are provided on the rear face of each of the discs 12, so that any two of the discs 12 can be releasably locked or secured together. The pair of complimentary interlocking means 16 include a female portion and a male portion which, of course, interlock with like interlocking means 16 on another one of the discs 12. These interlocking means 16 may be provided on the rear face, in diametrically opposed positions, as illustrated, and the male portion, as can be best seen in FIGS. 3, 4 and 6 includes a circular-shaped stud 21 having an axially disposed bore 22 in it, which may extend completely through the stud 21 and the front face of the disc 12, as illustrated, or it may terminate at the front face so that a flat, smooth, uninterrupted front face is provided on the disc. In the latter case, preferably only a thin membrane-like cover is provided over the end of the bore 22, so that it can be easily punched out, for reasons described more fully below. The stud 21 has a slot 23 extending diametrically across and through it, which divides it in half and permits the two halves to resiliently flex or bend during assembly. A rib 24 which is generally triangular-shaped in cross-section is provided on the outer surface of the stud 21, and this rib 24 extends substantially around the entire periphery of the stud 21, from one edge of the slot 23 to the other, on each of the two halves of the stud. This rib 24 is spaced from the rear face of the disc 12, as more fully described below.

The female portion of the interlocking means 16, as can best be seen in FIGS. 1 and 5, includes an annular-shaped spacer 26 which projects from the rear face of the disc and which has an axial bore 27 extending through it. A reduced diameter, inwardly extending annular flange 28 at the open end of the spacer 26 is proportioned to receive a stud 21 therethrough and to form a shoulder 29 to releasably lock with the rib 24 on the stud 21, as illustrated in FIG. 6, which shows one of the studs 21 interlocked within the spacer 26. The edge of the flange 28, at the entrance, is slightly rounded or beveled, as at 30, to permit the rib 24 to be more easily forcibly urged into the bore 27. The spacer 26 is proportioned such that the two discs 12, when affixed together, are retained in spaced-apart relationship, to permit the discs to be affixed to the spokes of a bicycle, with the spokes effectively clamped between them, as illustrated in FIG. 9. As in the case of the stud 21, the bore 27 may extend completely through the spacer 26 and the front face of the disc 12, or it may terminate short of the front face with a membrane-like sheet providing a smooth flat face on the disc.

In assembling the safety reflector 10 on the spokes of a bicycle, as illustrated in FIG. 9, one of the discs 12 is placed on each of the opposite sides of the spokes, and the discs 12 locked or secured together by engaging the interlocking means 16, with the spokes clamped between the discs 12. In engaging the interlocking means 16, the studs 21 and the spacers 26 on the respective ones of them are aligned, and then the studs 21 are forcibly urged into the bores 27 in the spacers 26, until the ribs 24 snap-actingly lock behind or with the shoulders 30. The studs 21 are relativelyh rigid, but the slots 23 permit the two halves of the studs 21 to flex sufficiently that the ribs 24 on them can pass through the flanges 28 and lock with the shoulders 30. The spacing between the rear face of a disc and the rib 24 on a stud 21 is such that the spacers 26 provide a slight leeway to compensate for slight variations in different spoke sizes. Once snap-actingly locked together, it is possible to disengage the two discs, but an instrument such as a screwdriver or the like normally is required to separate them. Accordingly, once a safety reflector 10 is affixed to the spokes, there is little likelihood that the reflector will be lost and, more importantly, theft thereof is discouraged because of the difficulty in removing it.

As indicated above, a safety reflector 10 formed of a pair of the discs 12 can be used in combination with a generally U-shaped band 18 to provide a safety reflector which can be clipped to a belt or a pocket of a skirt or pants, as illustrated in FIG. 11. The U-shaped band 18 may be of a resilient material such as metal or plastic so that it can be clipped on, and is proportioned to be securely clamped between the two discs. It may also have a small L-shaped leg 33 on the end of one of its legs, to prevent the safety reflector from sliding off.

An alternative construction is illustrated in FIG. 10 wherein the U-shaped band 18 has complimentary interlocking means formed on it, to permit a single one of the discs 12 to be affixed to the U-shaped band 18. Accordingly, a kit could be provided with two U-shaped bands 18 and two reflectors or discs 12, so that two reflectors can be made which will fasten to a belt or the like.

As illustrated in FIG. 12, a single one of the discs 12 can be affixed to the fender of a bicycle, by means of a threaded bolt extended through the bores in the stud 21 and the spacer 26. In such a case, a hole is first formed in the reflective material 14 and, in the event the membrane-like sheet is provided, it is punched out so that the threaded bolt can be extended through the bores.

From the above description, it can be seen that an extremely versatile safety reflector is provided. A kit can be sold or given away including two of the discs 12 and two U-shaped bands 18. With these, a side reflector 10 can be formed for a bicycle, by securing the two discs 12 together with the spokes clamped between them. Alternatively, a single belt or pocket reflector can be formed utilizing the two discs 12 with one of the U-shaped bands 18, or two such reflectors can be formed. Further still, the two disc reflectors can be affixed to the fenders of a bicycle.

The invention accordingly comprises an article of manufacture possessing the features, properties, and the relation of elements which will be exemplified in the article hereinafter described, and the scope of the invention will be indicated in the claims.

Now that the invention has been described, what is claimed as new and desired to be secured by Letters Patent is:

1. A safety reflector comprising a pair of molded support members of identical construction, each having a reflective material on a front face thereof and complimentary snap-acting interlocking means on a rear face thereof for lockingly securing said pair of support members together in spaced-apart relationship so as to receive therebetween an element for the purpose of removable securing said reflector to the element, said interlocking means comprising a complimentary spacer and a stud, said spacer projecting from said rear face and having a bore therein, a flange at the end of said bore providing a reduced diameter entrance into said bore and a shoulder within said bore, said stud having a rib extending at least partially about its peripheral side wall proportioned to be forcibly urged into said bore in said spacer to snap-actingly lockingly engage said rib behind said shoulder to secure said stud in said bore in said spacer to secure said pair of support members together, said support members when secured together being held in spaced-apart relationship by said spacers.

2. The safety reflector of claim 1, wherein said reflective material comprises a flat sheet of reflective material secured to the front face of said support members.

3. The safety reflector of claim 1, wherein said studs have a bore extending axially though them and a slot effectively dividing them in half, whereby said studs are rendered resilient and more easily forcibly urged into said bores in said spacers.

4. The safety reflector of claim 3, wherein the edge of said flange at the entrance to said bore is beveled or rounded to permit said ribs on said studs to be more easily extended into said bores in said spacers.

5. The safety reflector of claim 1, wherein said spacers are proportioned such that said support members are secured in spaced apart relationship to receive therebetween the spokes of a bicycle, whereby said safety reflector can be secured to the spokes of a bicycle by clamping the spokes between said pair of support members.

6. The safety reflector of claim 1, further including in combination therewith a generally U-shaped band having complimentary interlocking means thereof to permit one of said pair of support members to be secured to said band, to thereby provide a safety reflector which can be clipped to a belt or a pocket of a skirt or pants.

7. The safety reflector of claim 1, further including in combination therewith a generally U-shaped band which is adapted to be secured between said pair of support members, to thereby provide a safety reflector which can be clipped to a belt or a pocket of a skirt or pants.

8. The safety reflector of claim 1, further including bores therein which permit said support members to be individually secured to an object by means of a threaded bolt extended through said bores.

9. The safety reflector of claim 8, wherein said bores extend through said spacers and said studs.

* * * * *